Feb. 8, 1938. J. C. ADAMS 2,107,924
COFFEE MAKER
Filed Oct. 4, 1933
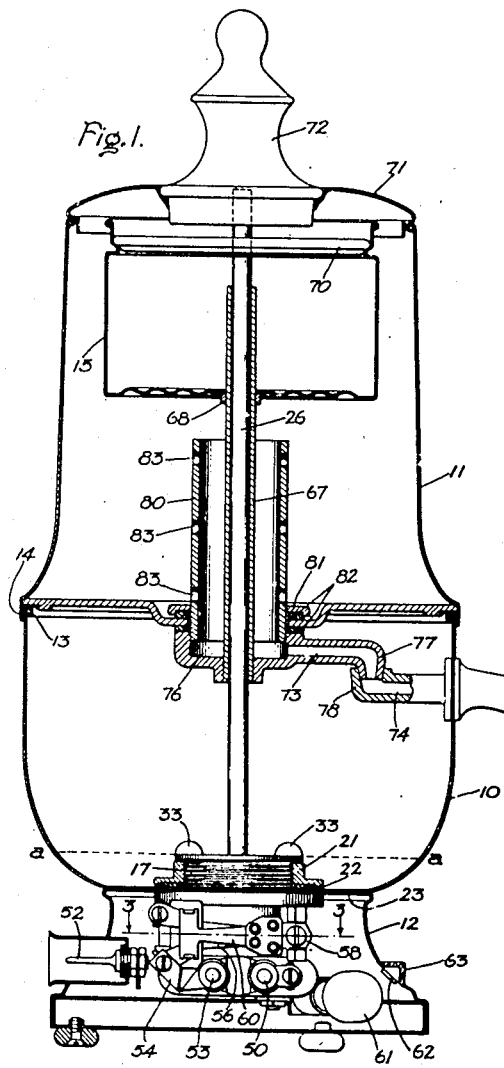
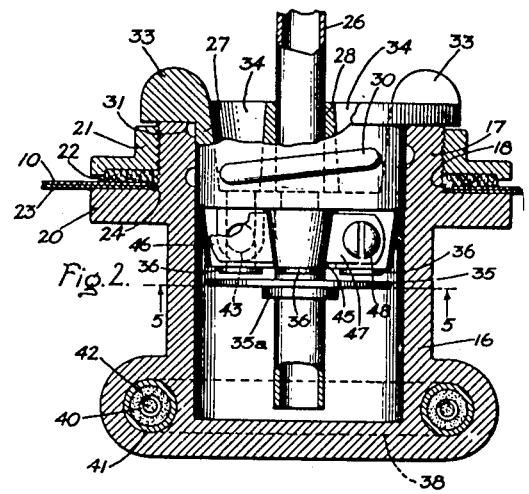
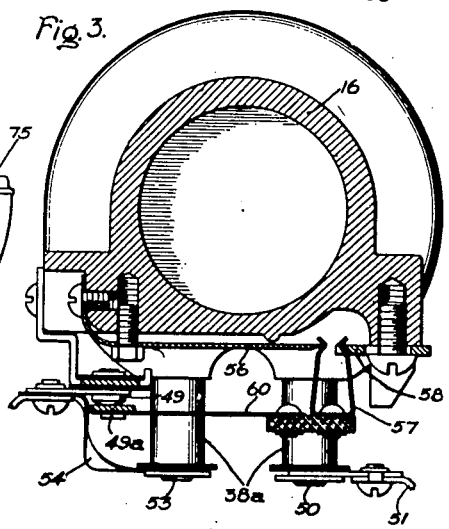
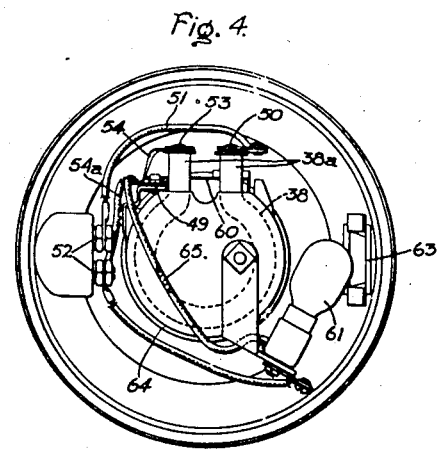
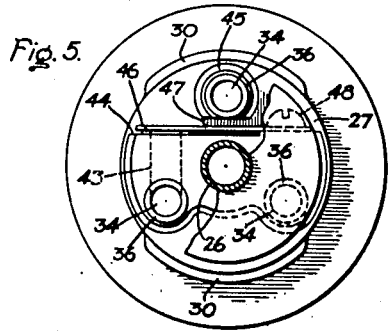
Inventor:
Joy C. Adams,
by Harry E. Dunham
His Attorney.

Patented Feb. 8, 1938

2,107,924

UNITED STATES PATENT OFFICE 2,107,924

COFFEE MAKER

Joy C. Adams, Bridgeport, Conn., assignor to General Electric Company, a corporation of New York Application October 4, 1933, Serial No. 692,097

14 Claims. (Cl. 53—3)

My invention relates to coffee makers, more particularly to coffee makers of the "drip" type wherein the heated water passes but once through the coffee grounds, and it has for its object the provision of an improved device of this character.

In one of its aspects, my invention contemplates the provision of an improved coffee maker of the drip type wherein the water is brought substantially to the boiling temperature and then is automatically caused to pass through the coffee grounds to an infusion receptacle which is separated from the boiling water.

My invention further contemplates the provision of suitable means for giving a signal when the infusion has been made, and further, the provision of means for heating the infusion to keep it warm after it has been made.

In carrying my invention into effect in one form thereof, I provide a water container, and above the container place an infusion receptacle. I use a suitable percolator pump for heating the water in the container and for transferring it to the infusion receptacle where it is caused to infuse coffee grounds in the receptacle. For this purpose, a heating chamber is arranged in the lower portion of the water container. This chamber communicates with the infusion receptacle by means of a percolator fountain tube and with the water container by a suitable passageway. This passageway is controlled by a valve which is operated to close the passageway by steam pressure generated in the heating chamber, whereby the heated water in the heating chamber is forced by the steam pressure up through the percolator fountain tube to the infusion receptacle. A container for coffee grounds is arranged in the upper portion of the infusion receptacle so that the water issuing from the fountain tube will flow into the coffee ground container and percolate through the ground coffee into the lower portion of the receptacle. I provide suitable thermal responsive means for relieving the steam pressure in the heating chamber so as to prevent percolator action until the water in the container has been heated substantially to the boiling point.

In one form of my invention, I accomplish this by providing a passageway between the water container and the heating chamber bypassing the controlling steam pressure operated valve so as to provide for a free circulation of fluid between these chambers, irrespective of the operation of the valve, and further provide a suitable thermostatically operated valve for closing the bypassing passageway when the temperature of the water in the container has attained substantially the boiling temperature, whereby the steam pressure valve can again control and effect percolator action.

This is an important feature of my invention because, as is well known, it is important in the drip process of making coffee that the water be heated substantially to the boiling temperature before it is passed through the coffee grounds; otherwise it cannot extract the proper essences from the grounds. If percolator action be permitted before the water in the container has been heated substantially to the boiling point and before the various parts of the apparatus have been heated, it is quite likely that the first part of the water pumped to the infusion chamber will by the time it reaches the ground coffee be considerably below the boiling point and, therefore, be unable to extract the true coffee flavor from the grounds.

In order to keep the infusion warm after it has been made, I have arranged the water container and the percolator heating chamber so that not quite all of the water within the container can flow to the heating chamber. In other words, after the infusion has been made, a small quantity of water will be left in the container. Suitable thermostatic means are provided for shutting off the heat when the temperature of the heating chamber, i. e., of the residual quantity of water rises to a predetermined high value, and to reapply the heat when this temperature falls to a predetermined low value. In this manner, the residual water is intermittently heated so as to generate sufficient heat to keep the infusion in the vessel above sufficiently warm.

In order to warn the attendant when the fusion has been made, I have provided a suitable signal device, such as an incandescent lamp, arranged to be operated by the thermostatic means so as to give an indication for each operation of the device to shut off and reapply the heat. By reason of this control, the lamp will be alternately energized and deenergized so as to provide an intermittent indication to the attendant.

For a more complete understanding of my invention, reference should be had to the accompanying drawing in which Fig. 1 is a vertical sectional elevation of a coffee maker arranged in accordance with my invention; Fig. 2 is an enlarged vertical section of a portion of the apparatus shown in Fig. 1; Fig. 3 is a sectional view taken through the line 3—3 of Fig. 1 and looking in the direction of the arrows; Fig. 4 is a bottom plan view of the apparatus with the bottom cover removed so as to illustrate certain details of construction; and Fig. 5 is a sectional view taken through the line 5—5 of Fig. 2 looking in the direction of the arrows, portions being broken away so as to illustrate certain structural details.

Referring to the drawing, I have shown my invention in one form as applied to a coffee maker of the "drip" type comprising a water container or receptacle 10 and a coffee infusion receptacle 11 placed above it. The water receptacle 10 is mounted upon a suitable base 12. The upper end of the water receptacle 10 is open, and its upper edge 13 is arranged to support the infusion receptacle 11. As shown, the infusion receptacle 11 is provided with a peripheral downwardly extending flange 14 which is arranged to fit tightly about the upper outer edge portion of the water receptacle so as to retain the infusion receptacle in its proper position upon the water receptacle.

A suitable ground coffee container 15 is supported in the upper portion of the infusion chamber 11. As previously pointed out, the water in the water container 10 is heated and transferred by percolator action up to the infusion chamber 11 where it is caused to percolate through the ground coffee in the container 15 to the lower portion of the infusion chamber 11.

In order to conduct the water from the fluid container 10 to the chamber 11, I provide a suitable heating chamber 16 mounted below the fluid container within the base 12. As shown, the heating chamber 16 is formed of a metallic cup-like body which is arranged to depend from the bottom of the fluid container 10. The chamber 16 is provided at its upper end with a threaded portion 17 that is projected upwardly through an opening 18 provided for it in the bottom wall of the fluid container 10. The body 16 is further provided with a peripheral flange 20 which is arranged to rest against the lower side of the bottom wall of the container. The body 16 is held in position by means of a flange or collar 21 above this bottom wall threaded upon the portion 17 of the plug. It will be observed that the flange 20 and the collar 21 function to sandwich the bottom wall of the container 10 between them so as to securely hold the heating chamber 16 in its proper position relative to the container. Preferably, a fluid-tight seal or washer 22 will be provided between the collar 21 and the bottom wall of the water container.

Preferably, the collar 21 will also be used to secure the base member 12 to the fluid container. As shown, the base member 12 is provided at its upper end with an inturned ledge 23 which is arranged to bear directly on the bottom wall of the water container, and which surrounds a centrally arranged aperture 24 for receiving the threaded portion 17 of the heating body, as clearly shown in Figs. 1 and 2. It will be observed that by reason of this arrangement when the collar 21 is screwed or turned downwardly to clamp the body of the fluid container it will function at the same time to secure the base 12 to the container.

Water from the container 10 is transferred to the heating chamber 16 in relatively small quantities where it is heated to the boiling point and transferred to the infusion chamber 11 by the steam pressure that is generated in the chamber 16. For this purpose, a suitable percolator fountain tube 26 is provided to convey the water from the heating chamber to a point in the infusion chamber somewhat above the ground coffee container 15 so that the water which issues from the tube 26 will fall directly into the coffee container. The fountain tube 26 is mounted in a plug-like body 27 which functions to support the tube 26 in a vertical position in the coffee maker. As shown in Figs. 1 and 2, the fountain tube 26 is received in an aperture 28 arranged centrally of the plug 27. The plug 27 on its exterior walls is provided with a series of threads 30 which cooperate with a thread 31 provided for them in the inner wall of the heating chamber 16. It will be observed that in order to assemble the fountain tube with heating chamber it is merely necessary to screw the plug inwardly into the chamber. Suitable lugs 33 are provided on the upper surface of the plug 27 in diametrically opposite positions to assist the attendant to apply the plug to the heating chamber and to remove it, as desired.

The plug body 27 is provided with three vertically arranged passageways 34 which function to allow water in the vessel 10 to gravitate to the heating chamber 16. While three of these passageways have been shown, it will be understood that any suitable number of the passageways may be provided.

Preferably, the fountain tube 26 will be supported in the plug body 27 so that the lower end portion of the fountain tube projects for a considerable distance down into the heating chamber when the plug body is in position in the chamber, as shown in Fig. 2. Supported on this projecting portion of the fountain tube is a flap valve 35 which is arranged to cooperate with the lower ends of the passageways 34 so as to control the flow of water from the container 10 to the heating chamber 16. As shown, the plug body 27 is provided with three bosses 36 on its under-side arranged so that the passageways 34 pass centrally through them. These bosses 36 form suitable valve seats for the valve 35 so that when the valve 35 is moved upwardly to engage the bosses it will tightly close the passageways. The valve has limited movement away from the bosses 36, as shown in Fig. 2, so as to open the passageways 34. Preferably, the valve will be supported upon a suitable ledge or collar 35a arranged on the fountain tube. This collar, of course, limits the movement of the valve away from the bosses 36.

It will be understood that in the operation of the device thus far described water will gravitate from the water container 10 through the passageways 34 to the heating chamber 16 where it will be heated substantially to the boiling point. Upon the generation of steam in the heating chamber, the valve 35 is lifted by the water and steam that attempt to escape back through the passageways 34. When the outlets in the bosses have thus been closed, the water in the heating chamber will be forced upwardly by steam pressure through the fountain tube 26 from which it falls into the ground coffee container 15. The steam pressure is thus relieved through the fountain tube, and the flap valve will gravitate to its open position. Then the above operation will be repeated.

It will be understood that any suitable means may be used for heating the chamber 16, but I prefer to use an electrical heating element of the sheathed type, cast or otherwise embedded in the material forming the lower end wall portions of the heating chamber. The heating element 38 provided for this purpose preferably will be formed into substantially a ring-shape, as shown in dotted lines in Fig. 4, so that its two end terminal portions 38a are relatively close to each other. These portions project laterally from the outer side wall of the heating chamber at points relatively close to each other, as shown in Fig. 3. The lower end portion of the body 16 is enlarged somewhat so as to provide a suitable body for receiving the heating element 38.

I prefer to use a sheathed element of the type described and claimed in the United States patent to C. C. Abbott, No. 1,367,341, dated February 1, 1921. As there described, this heating element comprises a helical resistance element 40 enclosed by a metallic sheath 41. The element 40 is embedded in and separated from the sheath by a compacted mass of heat refractory electrically insulating material 42, such as magnesium oxide. Heating elements of this type can be bent easily into any desired shape and so the element accommodates itself readily to the circular form given the heating element 38.

It will be well understood by those skilled in the art that percolator action will take place almost immediately upon energization of the heating element 38. In other words, percolator action will take place long before the entire body of water in the container 10 is heated to substantially the boiling point and before all parts of the coffee maker are hot. Because of this, it is quite likely that the first discharge from the fountain tube will be chilled before it reaches the ground coffee and, therefore, be incapable of extracting the real coffee essence from the coffee grounds. In order to overcome the difficulty, I have provided suitable means for releasing the steam pressure in the heating chamber 16 so as to prevent percolator action until the water in the container 10 has arrived substantially at the boiling temperature.

In order to accomplish this, I have provided a passageway establishing communication between the fluid container 10 and the heating chamber 16 bypassing the valve 35 so that a free circulation of fluid between the container 10 and the heating chamber can take place irrespective of the position or operation of the valve 35.

I utilize one of the passageways 34 to form in part this bypassing passageway. As shown in Figs. 2 and 5, I provide in the body member 27 a lateral passageway 43 extending from one of the passageways 34 to the side of the plug where it terminates on the exterior of the plug. Preferably, the lower portion of the plug body 27 in which the passageway 43 is formed will have a portion of a segment shape cut away, as clearly shown in Fig. 5. This leaves a vertical plane wall 44 and it is through this wall that the passageway 43 terminates on the exterior of the plug housing. As shown, the passageway 34 which normally would have passed through this segment-shaped portion had it been allowed to remain continues downwardly to the level of the bottom of the plug 27 through an enlarged boss 45. The boss 36 for this passageway 34, referred to above, is formed on the lower end of this relatively large boss 45.

The passageway 43 is controlled so as to provide substantially free communication between the fluid container 10 and the heating chamber 16 so long as the fluid in the container 10 has a temperature substantially below the boiling point, and to shut off this communication when the water in the container 10 reaches substantially the boiling point. For this purpose, a suitable valve 46 is provided to control the passageway 43. This valve 46 is operated by means of a suitable thermostat 47 which is set to hold the valve 46 in its open position as long as the water and steam circulating through the passageway is substantially below the boiling point, and to shut the valve immediately when the temperature of the water reaches the boiling point. This thermostat 47 preferably will be of the bimetallic type, and as shown, has one end rigidly secured to the face 44 of the heater plug by means of a screw 48, while its other end which carries valve 46 is free to move laterally in response to changes in temperature.

In operation, it will be understood that as long as the temperature of the fluid circulating about the thermostat 47, i. e., the water in the container 10, is below the boiling point, the valve 46 will be in its open position so as to allow a free circulation of steam and water between the heating chamber 16 and the container 10. This relieves the steam pressure in the chamber 16 so that the valve 35 quite likely will not be moved to its closed position; however, even if this valve does move to its closed position, nevertheless, the steam can escape through the ports 43 and 34 so that practically none of the water in the heating chamber 16 will be delivered to the infusion chamber 11 through the fountain tube 26. This operation will take place until the water in the container 10 has been heated substantially to the boiling temperature, whereupon the thermostat 47 will function to close the bypassing port 43. When this occurs the valve 35 will be closed by steam pressure, as previously described, and the water in the container 16 will be forced up through the fountain tube 26 into the immersion chamber 11. Thereafter, the valve 35 will function to control percolator action in the manner previously described.

I have provided suitable means for keeping the coffee infusion in the chamber 11 heated after it has been made. For this purpose, I have arranged the heating chamber of the container 10 so that not all of the contents of the container can flow into the heating chamber. In other words, after the infusion has been made there necessarily will be left in the container 10 a small quantity of water. For this purpose, I have arranged the threaded portion 17 of the heating chamber so that it will project for some distance above the bottom wall of the container 10, as clearly shown in Fig. 1. By reason of this arrangement, the water in the container 10 below the dotted line a—a will not flow through the passageways 34 into the heating chamber. It will be observed that when all of the water in the container 10 has been pumped to the chamber 11 with the exception of that below the level a—a, the heating element will rapidly heat this small quantity of water to the boiling point and the steam thus generated will keep the infusion warm by circulating over the bottom wall of the infusion chamber 11.

In order to keep the infusion warm and at the same time prevent overheating of the apparatus, I have provided a suitable temperature responsive means for controlling the heating element 38 so as to shut off the heat when the temperature in the heating chamber 16 reaches a predetermined maximum and to reapply the heat when this temperature falls to a predetermined minimum. For this purpose, I have provided a suitable thermostatic switch in the energizing circuit of the heating element 38.

This switch comprises a pair of switch contacts 49 connected in the heating circuit and a bridging contact 49a. As shown, the terminal 50, Figs. 1 and 4, of the heating element is electrically connected by means of a conductor 51 to one of the terminal pins 52, which pins are adapted to receive a terminal plug of a form well known in the art. The other terminal 53 of the heating element is electrically connected by means of a lead 54 to one of the fixed contacts 49 of the switch, the other fixed contact 49 of which is electrically connected by means of a lead 54a to the remaining terminal pin 52.

The bridging contact 49a is operated by means of a suitable thermostatic device in thermal relation with the chamber 16, and which may have any suitable construction, but which preferably will be of the type described and claimed in the United States patent to A. H. Simmons, No. 1,743,073, dated January 7, 1930.

Briefly, this thermostat comprises a bimetallic thermostat bar 56 having one end secured to the body of the heating chamber 16, as clearly shown in Figs. 1 and 3, while its other end is free to move laterally in response to changes in temperature. Bearing on this free end of the bimetal bar 56 is one leg of a U-shaped spring member 57, the other leg of which bears on a fixed knife edge bearing 58. This spring member carries on its base a switch actuating arm 60 which is electrically insulated from the spring, and which, as shown in Fig. 3, carries the bridging contact 49a. It will be understood that when the body 16 and hence, the bar 56, is heated to a predetermined maximum temperature, the bar will move away from the heating body 16 so as to move the bridging contact 49a away from the contacts 49, thereby cutting off the heat, whereas when the temperature of the body falls to a predetermined low value, the bar will operate to move the contact 49a to bridge the fixed contacts 49 so as to reapply the heat.

In other words, the thermostatic device functions to shut off the supply of heat a short period of time after the residual quantity of water has been heated to the boiling point and the body 16 heats up, and to reapply the heat when the temperatures of this quantity of water and the body 16 fall to a predetermined value. In this manner, the body of water left in the container 10 is heated at intervals so as to generate sufficient steam to keep the coffee infusion warm.

I utilize the thermostatic switch to control a suitable signal device to warn the attendant when the coffee infusion has been made. For this purpose, I have provided a suitable incandescent lamp 61 arranged to be visualized through a window 62 provided for it in the base 12. This window may be covered by means of a glass lens 63 which preferably will be colored red. One terminal of the lamp 61 is connected to one of the fixed contacts 49 by means of a conductor 64. The other lamp terminal is connected by means of a conductor 65 to the lower terminal pin, as viewed in Fig. 4, and from thereby means of the lead 54a to the other fixed contact 49. The lamp is thus connected across the fixed contacts 49. It will be observed that by reason of this arrangement, when the thermostatic switch is closed and the heating element is energized, the lamp 61 will be short circuited, and hence will be deenergized, and that when the thermostatic switch is opened, the heating element will be connected in series with the lamp. It will be understood that when the switch is opened for all practical purposes the heating element will be deenergized because only the small lamp current will be flowing through it; this current will not be sufficiently large to cause any material heating effect. Thus, after the infusion has been made and the heating element is alternately energized and deenergized to keep the infusion warm in the manner previously described, the lamp 61 will be alternately deenergized and reenergized to give an intermittent signal to the attendant that the coffee infusion has been completed.

The infusion chamber 11 preferably will be provided with a centrally arranged vertical tube 67 adapted to slide over the fountain tube 26 so as to stabilize the position of the infusion chamber. The metallic tube 67, as shown in Fig. 1, is threaded into the bottom wall of the infusion chamber. The tubular member 67 also functions to support the ground coffee container 15. For this purpose, the tubular member is provided with a collar or abutment 68 on which the ground coffee container rests.

It will be understood, of course, that the coffee container 15 will be covered by means of a suitable water distributing screen 70 in the usual manner. It will also be understood that the infusion chamber 11 will be provided with a suitable cover 71 which supports centrally thereof a glass cover member 72 arranged to spread the water which issues from the fountain tube 26 over the spreading screen 70 in a manner well understood by those skilled in the art.

The coffee infusion in the chamber 11 is drawn off through a discharge conduit 73 which communicates with a passageway 74 rigidly secured in the receptacle 10, and which in turn communicates with a suitable faucet 75. The conduit 73 communicates with the infusion chamber 11 by means of a sump 76 arranged in and centrally of the bottom of the infusion chamber. The conduit 73 at its discharge end is provided with a downwardly depending nozzle 77 which is arranged to be received in an upturned socket 78 provided for it in the conduit 74. By reason of this arrangement, it will be observed that when the infusion chamber 11 is placed upon the fluid container 10 the nozzle 77 will be received in the socket 78 so as to effect a fluid-tight connection between the conduits 73 and 74.

I have found when making coffee by the drip method that the hot water which first passes through the coffee grounds extracts more of the coffee essence or flavor than the hot water that is subsequently passed through the coffee grounds. The coffee infusion which is first made is, therefore, much stronger than the rest. I have also found that because of this the coffee infusion collects in layers or strata of different strength in the infusion chamber, the lower stratas which first collect being much stronger than the coffee in the higher stratas. Consequently, the first cup or so of coffee withdrawn from the infusion chamber will be quite a good deal stronger than the cups which are thereafter withdrawn from the chamber.

I have provided suitable means for mixing the several layers of the infusion so that the first cup of coffee withdrawn will be no stronger than the rest. For this purpose, I have provided an upright conduit 80 centrally of the infusion chamber, as shown in Fig. 1. This conduit communicates at its lower end with the discharge sump 76. As shown, the conduit 80 has a threaded connection with the sump. The conduit 80 may be and as shown is utilized to secure the sump to the infusion chamber. The conduit, as shown, projects upwardly through a centrally arranged aperture provided for it in the bottom wall, and directly above the bottom wall has a collar 81 threaded upon it so that the bottom wall is sandwiched between the collar and the sump. Suitable fluid-tight gaskets 82 are provided between the collar 81 and the bottom wall of the container and between the bottom wall of the container and the sump as clearly shown in Fig. 1.

The conduit 80 is provided with a plurality of apertures 83 arranged at different levels of the infusion chamber so that infusion is supplied to the conduit and hence to the sump from several different liquid levels in the infusion chamber. Thus, when the faucet 75 is opened so as to allow coffee infusion to flow from the chamber 11, the infusion of the several levels are mixed together in the conduit 80. The first cup of coffee withdrawn, therefore, will be formed of infusion of different degrees of strength, some of it coming from the stronger bottom layers, some from weaker intermediate layers and some from the weakest layers at the top. Likewise, the second cup will be filled with coffee from substantially the same liquid layers of the infusion chamber. In this manner, all of the cups will be filled with infusion of substantially the same strength.

It will be observed that I have provided a coffee maker for automatically making drip coffee wherein the water is first brought to the boiling temperature before substantially any of it is delivered to the coffee ground container 15. When the water has been brought to the boiling temperature it is automatically pumped from the water container 10 to the infusion chamber 11, passing, of course, through the coffee grounds on its way. It will also be observed that I have provided suitable means for keeping the coffee infusion warm after it has been made and for signalling to the attendant that infusion has been completed. In addition to this, I have provided suitable means for withdrawing coffee infusion from various layers in the infusion chamber, thereby insuring that the coffee in successive cups will have substantially the same strength.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A coffee maker comprising a liquid container, a heating chamber, a fountain tube in liquid communication with said heating chamber, a passageway for delivering fluid from said liquid container to said heating chamber where it is heated and delivered by steam pressure to said fountain tube and thermostatically operated means providing communication between said heating chamber and said liquid container so as to relieve steam pressure in said heating chamber to prevent the building up of a steam pressure sufficient to deliver a material quantity of liquid to said fountain tube until said liquid in said container has attained a predetermined high temperature.

2. A coffee maker comprising a liquid container, a heating chamber, a fountain tube in liquid communication with said heating chamber, a passageway for delivering liquid from said liquid container to said heating chamber where it is heated and delivered by steam pressure to said fountain tube and means for relieving said steam pressure in said heating chamber to prevent delivery of liquid to said fountain tube until the liquid in said container has attained a predetermined temperature.

3. A coffee maker comprising a liquid container, a heating chamber, a fountain tube in liquid communication with said heating chamber, a liquid passageway between said liquid container and said heating chamber, a valve controlling said passageway arranged to close said passageway by steam pressure generated in said heating chamber, a passageway between said liquid container and said heating chamber bypassing said valve so as to provide free circulation of liquid between said container and said heating chamber, irrespective of the operation of said valve, and temperature responsive means arranged to close said bypassing passageway when the liquid in said container attains a predetermined high temperature.

4. A coffee maker comprising a liquid container, a liquid heating chamber, a fountain tube communicating with said heating chamber, a passageway between said container and said heating chamber, a valve controlling said passageway arranged to be closed by steam pressure generated in said heating chamber, a passageway bypassing said valve so as to provide for liquid circulation between said container and said heating chamber, a valve controlling said bypassing passageway and means responsive to the temperature of the liquid circulating between said heating chamber and said container controlling said last named valve.

5. A coffee maker comprising a liquid container, a heating chamber below said liquid container, a vertically arranged fountain tube extending into said heating chamber, a substantially vertically arranged passageway connecting said liquid container with said heating chamber, a valve in said heating chamber arranged to be moved upwardly to close said passageway by steam pressure generated in said heating chamber, a passageway bypassing said valve providing for liquid circulation between said liquid container and said heating chamber irrespective of the operation of said valve, a valve controlling said bypassing passageway and temperature responsive means for closing said last-named valve when the temperature of the liquid in said container reaches a predetermined high value whereby liquid is not delivered to said fountain tube until it has attained a temperature at least as high as the predetermined temperature.

6. A coffee maker comprising a liquid container, a heating chamber having its upper end opening into said liquid container, a percolator fountain tube, a plug body mounted on said tube fitted into the upper open end of said heating chamber and supporting said tube so that its lower end projects into said heating chamber, a screw threaded connection between said plug and said heating chamber, passageways in said plug connecting said liquid container with said heating chamber, a flap valve mounted on the lower end of said fountain tube arranged to be moved upwardly to close said passageways by steam pressure generated in said heating chamber, a passageway providing liquid circulation between said liquid container and said heating chamber irrespective of the operation of said valve and means for closing said last-named passageway responsively to the temperature of the liquid in said container.

7. A coffee maker comprising a liquid container, a coffee infusion receptacle, a heating chamber below said liquid container, a fountain tube communicating with said heating chamber and extending vertically therefrom to said infusion receptacle, a liquid passageway between said liquid container and said heating chamber, a valve arranged to close said passageway responsive to steam pressure generated in said heating chamber so as to cause liquid in said heating chamber to be delivered by steam pressure to said fountain tube and a thermostatically operated valve operable to relieve said steam pressure in said heating chamber until the liquid in said container has attained a predetermined high temperature whereby liquid is not delivered to said fountain tube when it has a temperature below said predetermined high temperature.

8. A percolator including a water container, means for heating a portion only of said container, a discharge tube extending into said heated portion and valve means in said heated portion, operatively associated with the discharge tube, remaining open when the temperature of the water in the unheated portion of said container is substantially below the temperature of the water in said heated portion and becoming operative when the temperature of the water in the unheated portion of said container substantially equals the temperature of the water in said heated portion.

9. A percolator including a water container, means for heating a portion of said container in such manner that a difference of temperature is initially produced between the water in said heated portion of said container and the water in the other portion of said container, a discharge tube extending into said heated portion of said container and valve means in said heated portion of said container, operatively associated with the discharge tube, remaining open when the temperature of the water in said other portion of said container is substantially below the temperature of the water in said heated portion of said container and becoming operative when the temperature of the water in said other portion of said container substantially equals the temperature of the water in said heated portion of said container.

10. A percolator including a container for a substance capable of existing in a fluid state, means for heating a portion of said container in such manner that a difference of temperature is initially produced between the water in said heated portion of said container and the water in the other portion of said container, a discharge tube extending into said heated portion of said container, and valve means in said heated portion of said container, operatively associated with the discharge tube, remaining open when the temperature of said substance in said other portion of said container is substantially below the temperature of said substance in said heated portion of said container and becoming operative when the temperature of said substance in said other portion of said container substantially equals the temperature of said substance in said heated portion of said container.

11. A percolator including a container for a substance capable of existing in a fluid state, means for heating a portion of said container in such manner that a difference of temperature is initially produced between the water in said heated portion of said container and the water in the other portion of said container, a discharge tube extending into said heated portion of said container, and valve means in said heated portion of said container, operatively associated with the discharge tube, remaining open when the temperature of said substance in said other portion of said container is substantially below the temperature of said substance in said heated portion of said container and becoming operative when the temperature of said substance in said other portion of said container substantially equals the temperature of said substance in said heated portion of said container and the temperature of all of said substance in said container is at least a predetermined value.

12. A percolator comprising a container for a substance capable of existing in a fluid state, said container being provided with a plurality of chambers, means interposed between said chambers for permitting intercommunication between said chambers, means for discharging said substance in one of said chambers, means for heating said substance in one of said chambers and valve means, operatively associated with said discharging means, for interrupting the intercommunication between said chambers, said valve means being so designed that the intercommunication between said chambers continues so long as there is a substantial difference between the temperature of the substance in said heated chamber and the temperature of the substance in the intercommunicating chamber and is interrupted when said temperatures attain substantially the same value.

13. A coffee maker comprising a water container, an infusion receptacle above said water container separated therefrom by a metallic wall, a heating chamber below said water container having metallic walls, a fountain tube connecting said heating chamber with said infusion receptacle, liquid passageways between said water container and said heating chamber opening into said container at a level above its bottom wall so that water below said level cannot flow into said heating chamber, means for applying heat to the walls of said heating chamber so as to heat the water therein to the boiling point whereupon the water is forced by the steam generated through said fountain tube into said infusion receptacle, and a thermostatic device responsive to the temperature of said metallic walls of said heating chamber controlling said heating means to cut off the heat only when the water in said container falls to said level and the temperature of said metallic walls attains a predetermined maximum, and to reapply heat when said temperature falls to a predetermined minimum, whereby the residual water below said level is heated to maintain the temperature of said infusion.

14. A coffee maker comprising a water container, an infusion receptacle adjacent said water container, a heating chamber in the lower portion of said water container, a conduit connecting said heating chamber with said infusion receptacle, liquid passageways between said water container and said heating chamber opening into said container at a level above its bottom wall so that water below said level cannot flow into said heating chamber, means for applying heat to said heating chamber so as to heat the water therein substantially to the boiling point whereupon the water is forced by the steam generated through said conduit into said infusion receptacle, and a thermostatic device mounted on and responsive to the temperature of said heating chamber controlling said heating means to cut off the heat only when the water in said container falls to said level and the temperature of said heating chamber attains a predetermined maximum, and to reapply heat when said temperature falls to a predetermined minimum, the mean temperature being such that the residual water below said level is heated sufficiently to maintain the coffee infusion hot.

JOY C. ADAMS.

CERTIFICATE OF CORRECTION.

Patent No. 2,107,924.

February 8, 1938.

JOY C. ADAMS.

It is hereby certified that error appears in the printed specification of the above numbered patent requiring correction as follows: Page 5, first column, line 48, claim 1, for the word "fluid" read liquid; and that the said Letters Patent should be read with this correction therein that the same may conform to the record of the case in the Patent Office.

Signed and sealed this 15th day of March, A. D. 1938.

(Seal)

Henry Van Arsdale,
Acting Commissioner of Patents.